PHOTOTUBE CIRCUIT

Filed Oct. 29, 1953

INVENTORS
Edward O. Johnson
& William M. Webster, Jr.
BY Morris A. Rabkin
ATTORNEY United States Patent Office 2,782,320

Patented Feb. 19, 1957

2,782,320

PHOTOTUBE CIRCUIT

Edward O. Johnson, Princeton, and William M. Webster, Jr., Mercer County, N. J., assignors to Radio Corporation of America, a corporation of Delaware Application October 29, 1953, Serial No. 389,077

6 Claims. (Cl. 250—214)

This invention relates to extremely high gain operation of gas filled phototubes and more particularly to novel methods and circuits for operating gas phototubes at a voltage equal to or higher than breakdown potential without self sustained discharge.

Gas filled phototubes provide extremely high gains when operated at voltages equal to or higher than breakdown potential. At these high voltages the phototube ordinarily becomes unstable and may suddenly go into a self sustained discharge. Methods and circuits, utilizing a voltage supply equal to or higher than breakdown potential to operate gas phototubes at extremely high gain and without self sustained discharge, are set forth in the copending application for Letters Patent of the United States of Edward O. Johnson, RCA 37,476 filed on the date of filing of the present application.

A feature of this copending application is the provision of a variable impedance path in parallel with the gas phototube. When the photocurrent is low, the impedance of the path is high. Photocurrent build-up triggers the path to a relatively low impedance. The resultant drop in voltage across the phototube quenches the avalanche of current build-up and prevents a self sustained discharge. After the phototube has deionized, the variable impedance path recovers its high impedance. This restores the over-voltage across the phototube to complete the cycle of operation. Methods of recovery and circuits providing recovery of the original high impedance path are disclosed in the copending application. In accordance with the invention disclosed and claimed herein a resonant circuit is used in a novel manner to obtain recovery of the original impedance condition of a variable impedance path.

The principal object of this invention is to provide a method of restoring the high impedance of a variable impedance quench circuit associated with a gas phototube being operated at a voltage equal to or higher than breakdown potential without self sustained discharge.

Another object of this invention is to provide a method of restoring the impedance of said quench circuit to its original high impedance by means of a resonant circuit in parallel with the quenching circuit.

A further object of this invention is to provide a method utilizing reactive charging to allow said quenching path to recover its original high impedance.

A still further object is to provide circuits by which said methods may be carried out.

To operate a gas phototube with extremely high gain at a voltage equal to or higher than breakdown potential without self sustained discharge, a variable impedance path whose impedance is originally high is placed in parallel with the phototube. This path serves as a quench path. A reactive charging or resonant circuit including a condenser is placed in parallel with the quench path. When the quench path is triggered by the build-up of current in the phototube, its impedance drops to an extremely low value. This reduces the voltage across the phototube and prevents a self sustained discharge. The quench path must recover its original high impedance to reimpose the high voltage across the phototube for repetition of the current build-up cycle. Current flow through the low impedance quench path charges the parallel resonant circuit. After being fully charged, a condenser in the resonant circuit discharges. The reverse current flow drives the voltage across the quench path negative cutting off current flow through it, and allowing it to recover its original high impedance. This restores the overvoltage across the phototube to prepare for repetition of the current build-up cycle.

Figure 1:
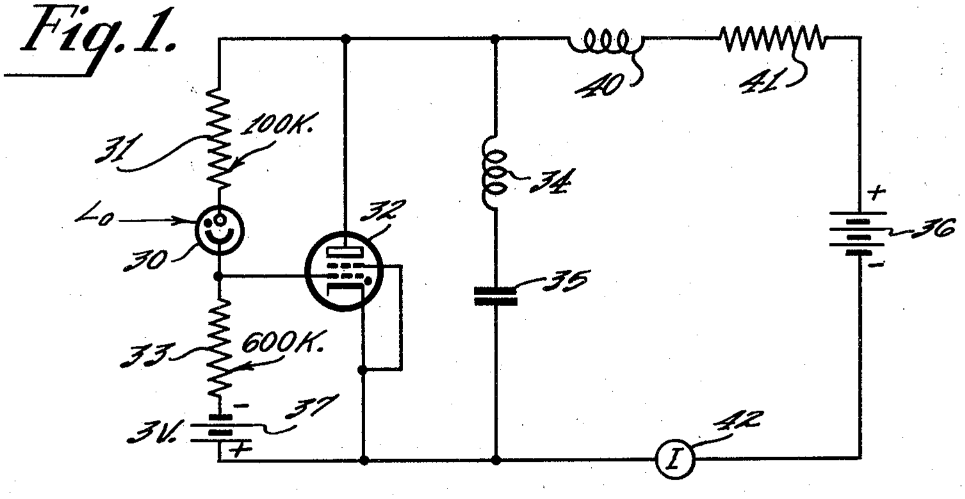
Figure 1 is a schematic representation of a high gain gas phototube circuit utilizing reactive charging means to restore the thyratron quench circuit.

In Figure 1, the gas phototube 30 and load resistor 31 are placed in parallel with the thyratron 32 which may be a type 2D21. A grid resistor 33 and a three volt bias source 37 are connected in the thyratron grid circuit to bias the thyratron to prevent its firing until rated current has been built up in the phototube. An inductor 34 and condenser 35 are series connected and placed in parallel with the thyratron 32. A source of D. C. voltage 36, high enough to exceed the breakdown potential of the phototube, is imposed across the parallel branches. A voltage of 255 volts, for example, has provided adequate current amplification when utilized in circuits of this type. Inductor 40 and resistor 41 are connected in series with the voltage source 36 to enhance the resonant action of the circuit. Milliameter 42 is connected in series with the supply 36.

Incident light $L_0$ impinging on the phototube releases electrons from the photocathode. These pass to the anode, generating en route new electrons by ionizing impacts with neutral atoms. The ions which result from this ionization travel back to the photocathode to release new electrons by secondary emission. If the voltage is high enough, i. e., greater than the breakdown potential, the secondary electrons released by the ion bombardment will be more numerous than the original photoelectrons. These secondary electrons go through the same chain of events as the original photoelectrons so that after a definite length of time the electron current in the phototube has "snow-balled" in avalanche fashion to a value of about a microampere. This current flowing through the grid resistor 33 of the thyratron 32 sets up a voltage that overcomes the grid bias and causes the thyratron 32 to fire. Thyratron 32 fires very rapidly reducing the voltage across the phototube 30 to the low operating value of 8 to 10 volts. Current build-up in the phototube is thus abruptly arrested before a self sustained discharge can occur, thereby preventing damage to the photosurface.

Figure 2:
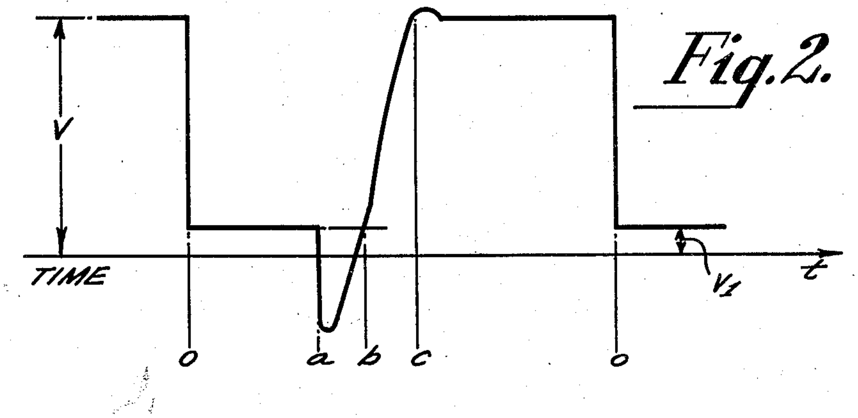
Figure 2 is a graph of phototube voltage versus time of the circuit illustrated in Figure 1.

Referring to Figure 2 the gas phototube 30 fires the thyratron at time $t=0$. This reduces the voltage across the phototube from the original value of V to $V_1$. This sudden lowering of voltage arrests the current build-up in the phototube before a damaging self sustained discharge can occur. At this low voltage the phototube deionizes. As current flows through the thyratron, the condenser 35 charges. After the condenser 35 is fully charged, it starts to discharge thereby reversing the current in the resonant loop. Condenser 35 discharges through the thyratron 32 and inductor 34. Voltage V across the thyratron is thereby driven negative. This occurs at the time $t=a$. As time elapses, condenser 35 builds up its original charge and V increases back to the original value of the supply voltage 36 so that the circuit is ready to be triggered again. The quenching thyratron 32 is given the time interval between $a$ and $b$ to recover. Voltage across the thyratron during this time interval is negative cutting off the conduction of the thyratron and allowing it to recover its original high impedance. In this way, the original voltage is restored across the phototube. The length of the negative voltage interval is mainly determined by the resistance of resistor 41 and the capacitance of condenser 35. Inductor 40 while not at all necessary for basic operation of the circuit can be used to provide a faster rise of supply voltage as it nears the full original value V.

The milliammeter 42 gives an average reading which is indicative of the build-up time between *c* and *o* and hence of the impinging light intensity. The circuit constants listed by way of example in the following paragraph are such that a change in light intensity of 2 to 1 gives about a 0.10 milliampere change in photocurrent. Larger current changes can be obtained if smaller values of resistance are used for resistor 41 in the circuit. Because of the non-linear relation between photocurrent and the incident light $L_0$, the sensitivity of the system is something like $10^4$ amperes per lumen at the $10^{-8}$ lumen level, and only 0.1 ampere per lumen at the $10^{-3}$ lumen level.

Typical parameter values are: resistor 41 of 4,000 ohms, inductor 40 and inductor 34 equal to 0.25 h., and condenser 35 of 0.1 microfarad. With these values, the interval between *o* and *a* and between *a* and *c* is about 1 millisecond. To keep the thyratron from firing prematurely when the supply V is switched on, it might be found desirable to shunt this tube with a condenser of about 0.01 microfarad capacity.

Figure 3:
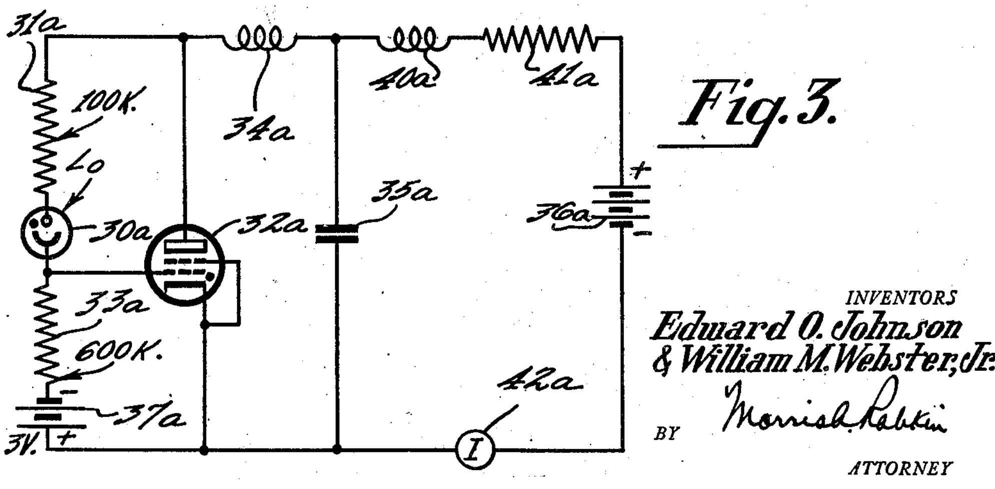
Figure 3 is a schematic diagram of a variation of the circuit shown in Figure 1.

In Figure 3 is shown another variant of the circuit in which the inductor 34 is placed in the circuit leg connected to the thyratron anode while the condenser 35 is left in its shunting position. Since all parts in Figure 3 are previously shown in Figure 1, the same reference characters are used for the same parts with the suffix "*a*" added.

It has been shown how reactive charging by means of a simple resonant circuit can be utilized to allow a quenching thyratron to recover its non-conducting high impedance state. This reactive charging phenomenon can be also applied to effect recovery of other types of variable impedance quench paths such as those utilizing vacuum tubes.

What is claimed is:

1. A circuit for attaining extremely high photocurrent amplification with a gas filled phototube comprising a gas filled phototube adapted to be exposed to incident light, a voltage supply across said phototube equal to or greater than the breakdown potential of the phototube, a path of variable impedance in parallel with the phototube, said path being of relatively high impedance when phototube current is relatively low, triggering means for suddenly dropping the impedance of the path periodically to a relatively low impedance in response to current build-up in the phototube, current conducting means in said path, said current conducting means comprising means to drop the voltage across the phototube during a condition of low path impedance, a resonant circuit in parallel with the variable impedance path having a capacitor, said capacitor comprising charging means while the variable impedance path is conducting current in its low impedance condition and discharging means for reversing the current in the resonant circuit to drive the voltage across the variable impedance path and across the phototube negative periodically thereby allowing the phototube to deionize and the variable impedance path to recover its original relatively high impedance periodically.

2. The combination as set forth in claim 1 wherein the path of variable impedance in parallel with the phototube is comprised of a thyratron, and the triggering means for suddenly dropping the impedance of the path to a relatively low impedance in response to current build-up in the phototube is comprised of a connection from the phototube cathode to the thyratron grid.

3. The combination as set forth in claim 1 wherein the resonant circuit is comprised of an inductor and said capacitor in series with each other and in parallel with the variable impedance path.

4. A circuit for attaining extremely high photocurrent amplification with a gas phototube comprising a gas filled phototube adapted to be exposed to incident light, said phototube having among other elements a cathode element, a voltage supply across said phototube equal to or greater than the breakdown potential of the phototube, a thyratron in parallel with the phototube, said thyratron having a cathode, an anode and a grid, said thyratron being of relatively high impedance and being non-conducting when phototube current is relatively low, a connection from the phototube cathode to the thyratron grid for triggering the thyratron to a relatively low impedance in response to current build-up in the phototube to drop the voltage across the phototube, a resonant circuit, means operatively connecting said resonant circuit to the thyratron, said resonant circuit having capacitive and inductive elements, said capacitive element being in parallel with the thyratron to charge while the thyratron is conducting current, said inductor being connected between the thyratron anode and to the said capacitive element, and said capacitive element comprising discharge means to reverse the current in the resonant circuit to drive the voltage across the thyratron and across the phototube negative periodically thereby allowing the phototube to deionize periodically and the thyratron to stop conducting periodically and to recover its original relatively high impedance.

5. A circuit for applying a relatively high voltage periodically across a gas filled phototube and for automatically decreasing the magnitude of said voltage periodically just before the gas within said tube breaks down comprising a gas filled phototube having a cathode, a thyratron having an anode, a grid and a cathode, a capacitor, a voltage source, means to connect said phototube, said thyratron, said capacitor and said voltage source in parallel with each other whereby to apply voltages from said voltage source across said phototube, said thyratron and said capacitor, said voltage across said phototube being at least equal to or greater than the voltage necessary to cause excessive current to flow through said phototube and to break down the gas therein, said connecting means comprising a resistor connected in series with said voltage source and said cathode of said phototube and an inductor connected between said capacitor and said anode of said thyratron, means connecting said cathode of said phototube to said grid of said thyratron, said resistor and said last-mentioned connecting means comprising means to fire said thyratron just before said voltage across said phototube breaks down the gas therein, and said capacitor and said inductor comprising means to cause said thyratron to cease conducting whereby said voltage across said phototube is applied periodically.

6. A phototube circuit as defined in claim 5 wherein said capacitor and said inductor comprise a series resonant circuit.

References Cited in the file of this patent

UNITED STATES PATENTS

| | | |
|---|---|---|
| 2,014,786 | Shepard | Sept. 17, 1935 |
| 2,432,084 | Blair | Dec. 9, 1947 |
| 2,546,734 | Farber | Mar. 27, 1951 |